United States Patent [19]
Haensel

[11] 3,790,350
[45] Feb. 5, 1974

[54] APPARATUS FOR CATALYTIC CONVERSION OF FLUIDS

[75] Inventor: Vladimir Haensel, Hinsdale, Ill.

[73] Assignee: Universal Oil Products Company, Des Plains, Ill.

[22] Filed: Dec. 22, 1971

[21] Appl. No.: 210,937

[52] U.S. Cl............ 23/288 F, 23/288 R, 252/477 R
[51] Int. Cl.............................................. B01j 9/04
[58] Field of Search... 23/288 R, 288 F, 288 E, 284, 23/283; 261/94, 95, 98; 55/491, 490; 165/185, 180; 252/477 R

[56] References Cited
UNITED STATES PATENTS

| 2,408,164 | 9/1946 | Foster | 252/477 R X |
| 2,156,422 | 5/1939 | Baader | 23/288 R |
| 3,431,082 | 3/1969 | Sellin | 23/283 X |

FOREIGN PATENTS OR APPLICATIONS

| 413,967 | 7/1934 | Great Britain | 23/288 F UX |

Primary Examiner—James H. Tayman, Jr.
Attorney, Agent, or Firm—James R. Hoatson, Jr.; William H. Page, II; Ronald H. Hausch

[57] ABSTRACT

Apparatus for catalytic conversion of fluids. The apparatus includes a catalyst element that comprises a support wire to which a plurality of subdivided catalyst particles having openings therethrough are threaded thereon. Means is provided on the support wire for maintaining the catalyst particles in place.

5 Claims, 14 Drawing Figures

APPARATUS FOR CATALYTIC CONVERSION OF FLUIDS

BACKGROUND OF THE INVENTION

The present invention is directed to the means of catalytically converting a fluid and particularly to a unique arrangement of catalyst material. Specifically, subdivided catalyst material is threaded on a support wire and placed in a housing for contacting a fluid such as exhaust gases from an internal combustion engine.

The use of catalysts in catalytically active zones to promote chemical reactions has received extensive attention in commercial processes and in the control of air pollution. For many years considerable research has been devoted to the discovery and improvement of catalytic materials which will accelerate desired chemical conversions with the idea that for most reactions there is some material or composition of material which will catalyze and promote the reactions more efficiently and economically than known methods of catalysis. Concurrent with the increasing use of catalysts has been the development of catalytic apparatus. Numerous types of such apparatus and methods of employing catalytic material have been proposed. Thus, catalytic materials have been prepared as gels, powders, pellets, and other forms and have been arranged in solid beds, layers, spaced beds, tubes, suspensions, and other manners. Such forms and manners of arrangement have been more or less satisfactory, the particular form and arrangement depending to some extent upon the particular catalyst material being used and the operation in which it is being used, but more efficient ways are constantly being sought.

Catalysis has become quite important in the removal or conversion of noxious compounds of exhaust gases from automobiles, trucks, etc. The combustion of hydrocarbon fuel via gasoline or diesel engine results in the presence of substantial quantities of unburned hydrocarbons, carbon monoxide, oxides of nitrogen, and other undesirable products, which discharge into the atmosphere through the exhaust line. With the ever increasing concentration of automobiles, particularly in urban areas, the resulting accumulation of these undesirable products in the atmosphere may reach high proportions. These combustion products are known to react with atmospheric gases to produce smog or pollution. Such waste products include, for example, saturated and unsaturated hydrocarbons, carbon monoxide, aromatics, particularly oxygenated hydrocarbons, such as aldehydes, ketones, alcohols, and acids as well as oxides of nitrogen and sulfur and polynuclear aromatics. In a catalytic operation, the hot exhaust gases issuing from the engine manifold are passed through a catalytic zone maintained within a converter, so as to effect a more or less complete conversion of the waste products in the exhaust to a harmless state.

A device proposed to be used as a catalytic converter is shown in U.S. Pat. No. 3,186,807 issued to P.J. Bolek on June 1, 1965. There subdivided particles of catalytically active material are maintained between screening or perforate partitions. Another type of device which has been proposed for use in the conversion of exhaust gases is shown in U.S. Pat. No. 3,441,381 issued to C.D. Keith et al. on Apr. 28, 1969. This device contains a catalytically active honeycomb structure. Other devices such as the device shown in U.S. Pat. No. 2,526,657 issued on Oct. 24, 1950 to J.A. Guyer utilize screening that is coated with a catalytically active element. Other examples of typical prior art include U.S. Pat. No. 3,492,098 issued to T.V. DePalma et al. on Jan. 27, 1970. In this patent discs or screens are supported by a flexible shaft member. The device in U.S. Pat. No. 2,644,800 issued on July 7, 1953 to H.O. Mottern et al. comprises a metal support element with flanged portions. The element which is coated with a catalytic surface coating is placed into a catalytic reactor.

The problems with these prior art devices basically are as follows. Any type of catalytically active screens or metal supports has the main disadvantage in that there is relatively little surface to impregnate with an active species of catalyst. It also has the disadvantage that if the support becomes too large it acts as a conductor of heat and may dissipate any heat generated by catalysis. The honeycomb type structure such as shown in the Keith patent to be self supporting must have large walls, cross-sections and thus use up much of the area without having any surface of contact. It is also susceptible to cracking under severe conditions. Also, typically, it is made of material that does not have the high surface area that is usually associated with catalysis. Thus, the honeycomb structure must be coated first with a surface extended solid such as alumina, then with a catalyst. It has been found that the catalyst and alumina surfaces tend to wear off over extended periods of time. Although the material used for a catalyst support is usually made of a surface of a material having high surface dimensions in subdivided beds, the bed of catalyst usually produces very high pressure drops. Also when used in an automobile there is generally loss of catalyst by attrition. Furthermore if the catalyst is a surface type catalyst it tends to wear off from the catalyst support. The present invention tends to minimize the disadvantages of all these prior art apparatus.

SUMMARY OF THE INVENTION

Thus it is a principal object of this invention to provide the means for catalytically converting fluids such as exhaust gases.

It may also be considered an object of this invention to provide for an apparatus for the conversion of exhaust gases which has a large surface of catalytic activity, low pressure drop characteristics, and long lasting characteristics.

Another object of this invention is to provide an element for a catalytic converter. Other objects will become apparent from the description of this invention.

Thus, in one of its broadest aspects the present invention provides for a catalyst element for a reactor comprising: (a) a support wire; (b) a plurality of subdivided catalyst particles having openings therethrough being threaded onto said support wire through said openings; and, (c) means on said support wire for maintaining said catalyst particles on said support wire.

The subdivided catalyst material may take the form of spheres, cylinders, pellets, or other regular or irregular shapes. Preferably the catalyst material is comprised of a metal or metal oxide or a combination thereof in combination with an organic refractory support material, such as alumina, silica-alumina-zirconia, silica-thoria, silica-boria, and the like. Of course, the particular catalyst metal or metal oxide used will depend upon the reaction which is to take place within the reactor in which the element is used. Suitable catalysts include the metals and metal oxides of Groups I, V, VI, VII and VIII of the Periodic Table, particularly chromium, copper, nickel, and platinum. These combinations may be used singly or in combination of two or more, etc., and will generally be composited with the support material. Of course, many other catalysts may be utilized in conjunction with the present invention. To provide more contact area the subdivided catalyst particles may be sized and arranged so that particles of different sizes are adjacent to each other. Also the catalyst particles may be spaced by inert particles of smaller sizes to allow more of their surface to be exposed to the fluid.

In another embodiment the present invention provides for a catalyst element for a reactor comprising: (a) at least two support wires; (b) a plurality of subdivided catalyst particles having openings therethrough being threaded onto said support wires through said opneings; and, (c) supporting frame means connecting the ends of said support wires for maintaining the support wires taut and for maintaining the catalyst particles in place on said support wires.

Again the subdivided catalyst particles may be of any shape such as spheroids, cylinders, and the like. Preferably, the supporting frame means will be comprised of a ring. The support wires may be made parallel and attached at their ends to the ring or, on the other hand, may be connected radially to the ring. In one embodiment the supporting frame means is comprised of two spaced apart screen elements. The support wires connect the screen elements and the fluid flow is directed in a general longitudinal direction through the screen elements to contact the subdivided catalyst particles supported between the screen section.

Another embodiment of the present invention provides for a catalytic reactor for converting a fluid stream comprising in combination: (a) an outer housing; (b) means for introducing and withdrawing said fluid stream from said housing; (c) a catalyst element within said housing; (d) said catalyst element comprising at least one support wire supported in said housing, a plurality of subdivided catalyst particles having openings therethrough being threaded onto said support wires, and means for maintaining said catalyst particles on said support wire.

Reference to the accompanying drawing and the following description thereof serve to more fully illustrate the present invention as well as to set forth additional advantageous features in connection therewith.

DESCRIPTION OF THE DRAWING

Referring to FIG. 1 of the drawing in more detail there is shown a catalyst element 1 which is comprised of a series of parallel support wires 2 on which a plurality of subdivided catalyst particles 3 are threaded. The particles 3 are threaded through openings 4 in each particle. The support wires are maintained on a supporting frame means 5 which in this particular embodiment is in a shape of a ring. The shape should not be limiting upon the present invention for other shapes of support frames are considered. For example, ovals, rectangulars, or triangulars and the like may well be utilized, although the circular shape presents means whereby the element may be inserted into a circular shape conduit. The supporting frame or ring 5 maintains the support wires taut and also serves to maintain the catalyst particles in place on the support wires. The wires used may comprise any of the metals or metal alloys suitable for the temperature conditions of the converter, such as the stainless steel alloys, nichrome, and the like. The catalyst particles themselves may comprise a metal or metal oxide in Groups I, V, VI, VII, and VIII of the Periodic Table, particularly, chromium, copper, nickel and platinum which may be used singly or in combinations of two or more and will generally be composited with an inorganic refractory support material, such as alumina, silica-alumina, silica-alumina-zirconia, silica-thoria, silica-boria, and the like. Preferably, the support material is comprised of gamma alumina and may be pilled, extruded, or pelleted by conventional methods. The particular method and forming the particles themselves will of course depend on the shape of the particle. In FIGS. 3 and 4 cylindrical shaped particle 32 is shown with an opening 34 therethrough. This was formed as a compressed alumina mixture powder tablet or as an alumina powder extrusion before the alumina was calcined. In FIG. 5 a sphere shaped particle 42 is shown with an opening 43 therethrough. This may be formed by molding a plastic preform or by compression of a powder charge. In FIG. 6 a modification of the cylinder shaped pill is shown as particle 52 with opening 54 therethrough. This may be formed in the same manner as the cylinder of FIGS. 3 and 4; however, it is noted that the edges of the cylinder are beveled at 57. The bevel of 57 establishes a means to expose more surface area of the catalyst to the contacting fluid.

Referring now to FIG. 2 of the drawing it is seen that a plurality of elements 1 may be inserted and supported in a housing such as conduit 10 which may serve as the catalytic reactor. The housing 10 may be installed into the existing exhaust system of the internal engine by conventional means not shown. The elements may be spaced as shown in FIG. 2 or on the other hand may be placed immediately adjacent to each other. It is believed, however, that spacing the elements a slight distance will provide more surface of contact for the exhaust gases. Also it is possible to rotate each element with respect to each other in the housing so that support wires 2 of adjacent elements are non-parallel.

Figure 1:
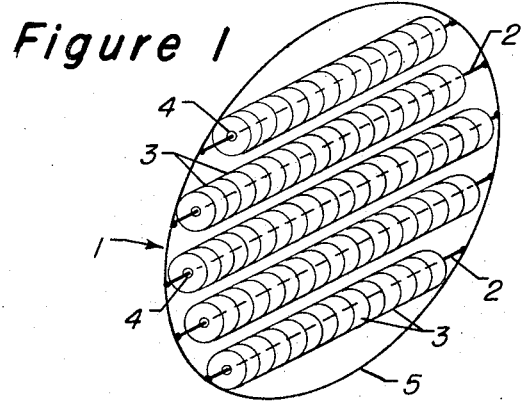
FIG. 1 of the drawing is a pictorial schematical view of one embodiment of a catalytic element of this invention.
Figure 2:
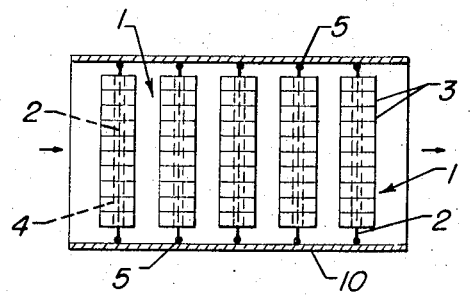
FIG. 2 of the drawing is a sectional view of a reactor containing catalyst elements.
Figure 3:
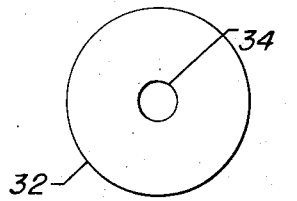
FIG. 3 of the drawing is a front elevational view of a cylinder form catalyst particle used in conjunction of this invention.
Figure 4:
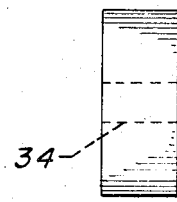
FIG. 4 of the drawing is a side elevational view of the particle of FIG. 3.
Figure 5:
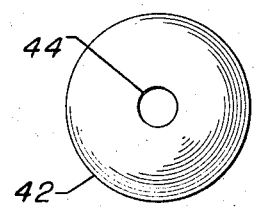
FIG. 5 of the drawing is an elevational view of a spheroid shaped catalyst particle.
Figure 6:
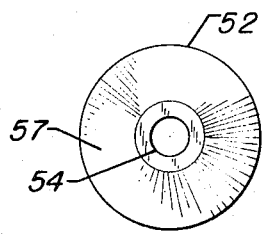
FIG. 6 of the drawing is a front elevational view of a cylindrically shaped catalyst particle having beveled edges.
Figure 7:
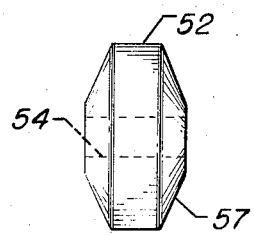
FIG. 7 of the drawing is a side elevational view of the particle of FIG. 6.
Figure 8:
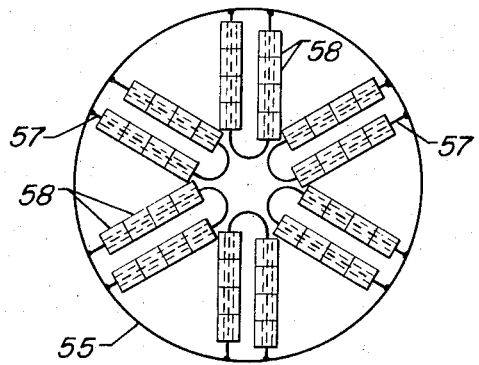
FIG. 8 of the drawing illustrates one embodiment of the arrangement of the subdivided particles of this invention.

While in FIG. 1, the support wires for the subdivided catalyst particles are parallel to each other and supported on a ring, other configurations and arrangements of the support wires and the subdivided particles are contemplated. For example, in FIG. 8 of the drawing the supporting frame is comprised of a ring 55. The support wires 57 are U-shaped and are attached to the ring 55 at their ends. The catalyst particles 58 are of cylindrical form but are or may be of different sizes so that more of their surface area may be exposed to the fluid.

Figure 9:
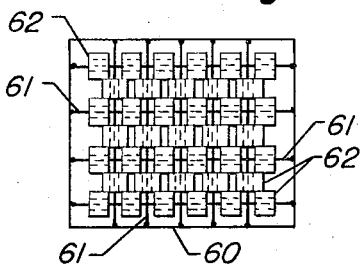
FIG. 9 of the drawing is another embodiment of the catalytic element of this invention.
Figure 10:
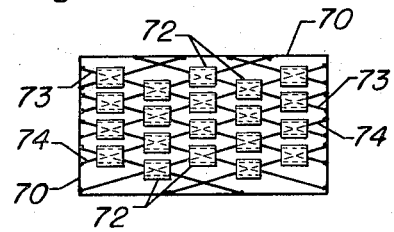
FIG. 10 of the drawing is another embodiment of the catalytic element of this invention.

In FIG. 9 the support frame 60 is square shaped and the arrangement of the support wires 61 is in the form of basket weave with cylindrical pellets 62 being arranged in transverse directions. In FIG. 10 of the drawing the supporting frame 70 is rectangularly shaped with each cylindrical pellet 72 being threaded on two wires 73 and 74 which are crisscrossed to provide a stable arrangement.

Figure 11:
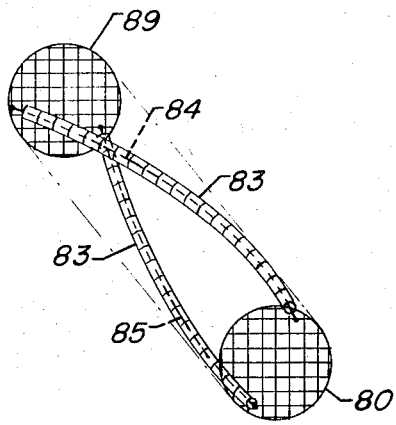
FIG. 11 of the drawing is another embodiment of the catalytic element of this invention.
Figure 12:
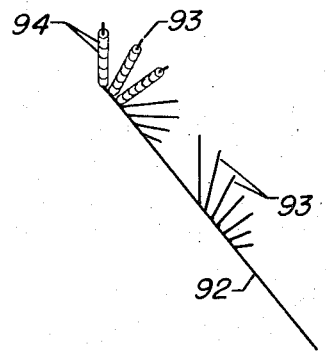
FIG. 12 of the drawing is another embodiment of the catalytic element of this invention.

In FIG. 11 the supporting frame means is comprised of two screen elements 80 and 89 to which non-intersecting skew support wires 84 and 85 with pellets 83 threaded thereon are attached in a taut manner. Only these two wires are shown for simplicity sake although it is contemplated that a plurality of more than two wires be utilized. It is also contemplated that the wires be made parallel and attached to the screen elements 80 and 89. This particular element may be inserted into the housing of a reactor. In FIG. 12 the supporting frame comprises an axial wire 92 to which a series of support wires 93 are arranged in a bristle brush type arrangement with pellets 94 threaded thereon.

Figure 13:
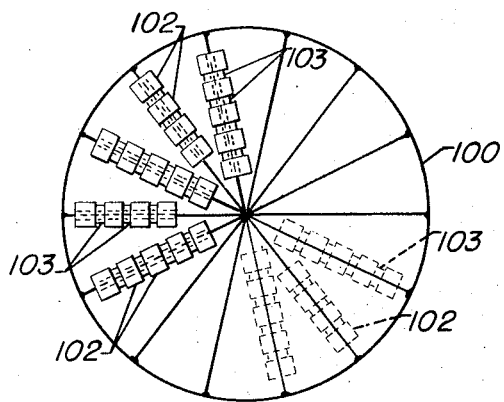
FIG. 13 of the drawing is another embodiment of the catalytic element of this invention.

In FIG. 13 of the supporting frame means again comprises a ring 100 but the attachment of the support wires is done in a radial manner. Also between each subdivided particle 102 there is disposed an inert particle 103 to space the catalyst particles and thus open a greater surface area of each catalyst particles to fluid contact. It is noted that the inert particles 103 are made of smaller size to provide the greater surface of contact on the catalyst particles 102.

Figure 14:
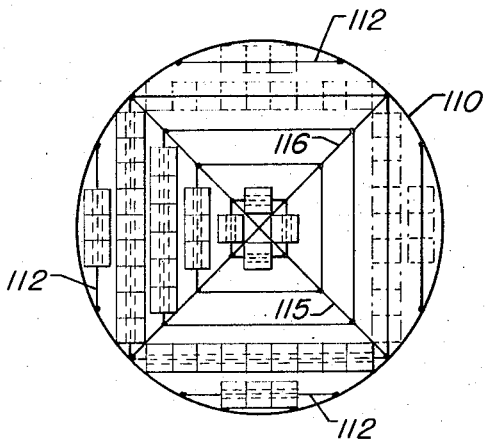
FIG. 14 of the drawing is another embodiment of the catalytic element of this invention.

In FIG. 14 the supporting frame is comprised of a ring 110 with two perpendicular wires 115 and 116 to which the support wires 112 are attached.

From the foregoing it can be seen that various arrangements of subdivided catalyst particles may be provided depending on the particular effects desired; however, other arrangements are contemplated. In fact, it is comtemplated that only one support wire be used as the reactor with the plurality of subdivided catalyst particles being threaded onto that one support wire. The activity of the catalyst particles as well as the amount of conversion desired will by necessity determine the amount of support wires and catalyst particles utilized in any one application. As previously mentioned the catalyst particles may be pilled or extruded. One advantage of the present invention is that it permits the use of catalyst of different size, chemical composition, and hardness in the same catalytic reactor which may be arranged in a predesigned pattern which can in part be desired effect. For example, a very active catalyst particle may be disposed at the reactor inlet, which will initiate conversion at lower temperatures and a catalyst of lesser activity may be utilized in the downstream portion of the reactor. Also, a catalyst for hydrocarbon and carbon monoxide may be intermingled with a catalyst for nitrogen oxide conversion.

The present invention has a distinct advantage over the metal support type reactor such as screen coated with platinum in that the alumina or inorganic refractory oxide has more sites available for impregnation of an active catalyst. The present invention provides an arrangement whereby less pressure drop will result per unit of activity than would be possible in honeycomb material. Actually the catalyst in the present invention is used more efficiently since in a honeycomb material fluid flow will usually go laminar after initial entry into the honeycomb material which reduces the interaction between the fluid and catalyst. The present invention has a distinct advantage over beds of subdivided catalyst material in that the pressure drop is considerably less for the same amount of activity. Also there is less chance of attrition due to abrasive action of catalyst particles upon each other. Also because the catalyst particles and elements may be spaced from each other the use of catalyst surface is apparently more efficient in the present invention. Another advantage over the honeycomb and particle type reactor is that if the reactor containing catalyst is arranged according to the concepts taught in this specification overheats, the catalyst material will not fuse together. Actually, the wires used for supporting the catalyst particles may be chosen carefully so as to act as a fuse upon overheating. If the reactor overheats, the wires it can merely break and allow the catalyst to pass through the reactor. In the honeycomb or bed type reactor typically the particles fuse together and block all flow through the reactor and thus adversely affect the system to which the reactor is connected.

I claim as my invention:

1. A catalyst element for a tubular shaped reaction chamber comprising:
   a. a circular shaped support wire means within said reaction chamber of a dimension to abut the inner side wall of said chamber;
   b. a series of evenly spaced radially disposed wires within said circular support wire and connected thereto and extending from or about the center of the circular shape of said support wire, said radially disposed wires being in the same plane with respect to each other, said radially disposed wires being positioned transversely to the longitudinal axis of said reaction chamber;
   c. a plurality of cylindrical catalyst particles provided with longitudinal center bores therethrough, said catalyst particles being disposed via said bores in end to end relationship upon each of said radially disposed wires; and
   d. said arrangement as defined in (a), (b) and (c) hereof presenting a large surface area of activity of said particles.

2. The element as defined in claim 1 further characterized in that said radially disposed wires intersect at said center and are joined together at that point.

3. The element as defined in claim 1 further characterized in that said radially disposed wires are of U-shape at one end thereof, said one end terminating adjacent said center, the other ends thereof being connected to said circular support wire.

4. The element as defined in claim 1 further characterized in that each of said catalyst particles is provided with beveled edges at each end thereof.

5. The element as defined in claim 1 further characterized in that said catalyst particles are spaced by catalytically inert particles of smaller size.

* * * * *